L. JAENICHEN.
SCALE.
APPLICATION FILED APR. 16, 1915.
1,171,522.
Patented Feb. 15, 1916.
2 SHEETS—SHEET 1.
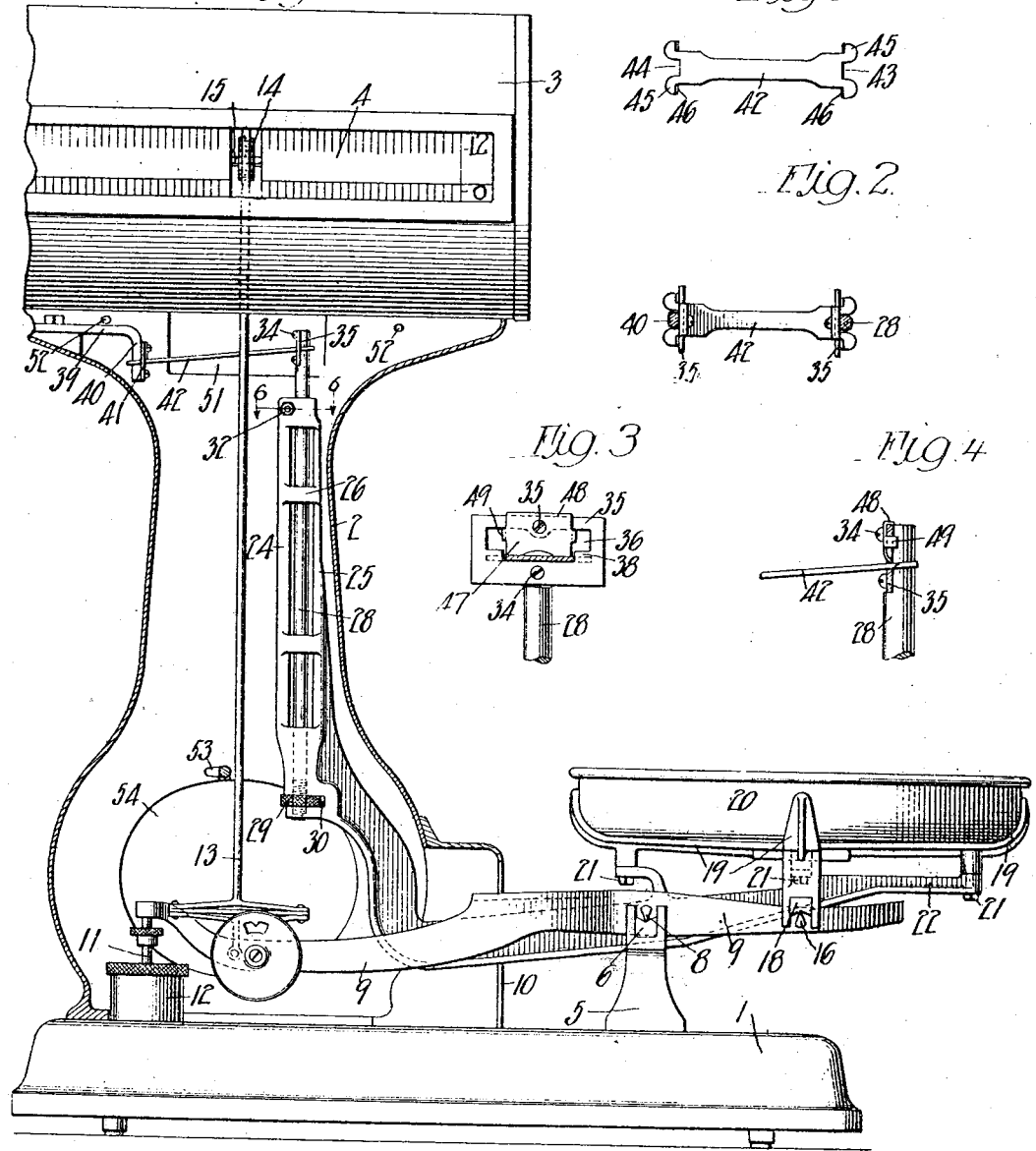
WITNESSES
E. H. Barrett
H. W. Kreinbring
INVENTOR
Louis Jaenichen,
by
Pagelsen & Spencer
ATTORNEYS L. JAENICHEN.
SCALE.
APPLICATION FILED APR. 16, 1915.
1,171,522.
Patented Feb. 15, 1916.
2 SHEETS—SHEET 2.
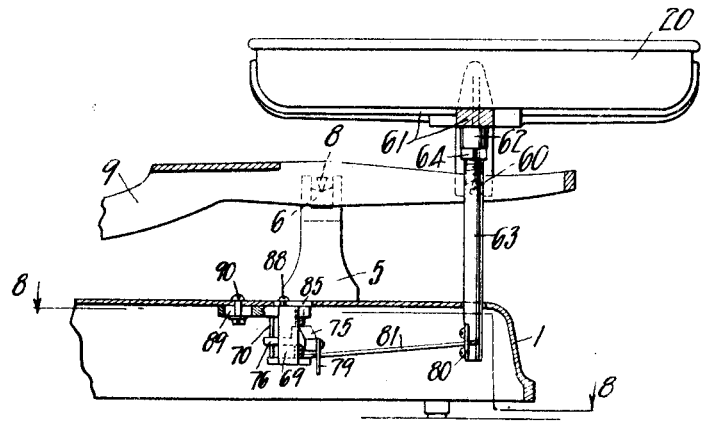
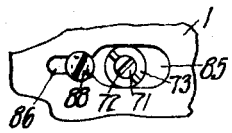
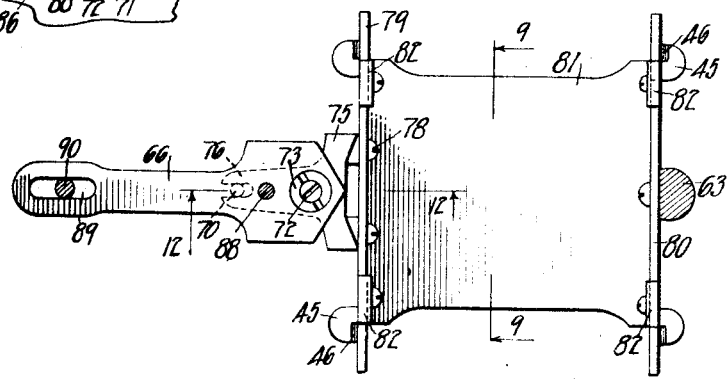
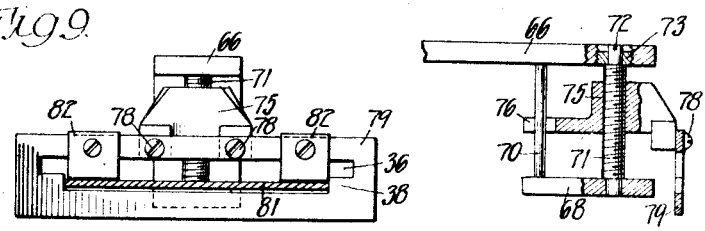
WITNESSES
E. R. Barrett.
Ha. V. Kreinbring
INVENTOR
Louis Jaenichen,
by
Pagelsen & Spencer
ATTORNEYS

UNITED STATES PATENT OFFICE.

LOUIS JAENICHEN, OF DETROIT, MICHIGAN, ASSIGNOR TO STANDARD COMPUTING SCALE COMPANY, LIMITED, OF DETROIT, MICHIGAN.

SCALE.

1,171,522.

Specification of Letters Patent.   Patented Feb. 15, 1916.

Application filed April 16, 1915.   Serial No. 21,629.

*To all whom it may concern:*

Be it known that I, LOUIS JAENICHEN, a citizen of the United States, residing at Detroit, in the county of Wayne and State of Michigan, have invented a new and useful Scale, of which the following is a specification.

This invention relates to scales of the type in which a main lever, a check arm or rod and a check link are used; and one of its objects is to provide means whereby the check link may be conveniently and accurately adjusted in respect to the line joining the pivot for the main beam to the pivot for the check link, without tipping the scale bodily.

The nature of the invention will be more fully understood from the following description and the accompanying drawing, in the latter of which—

Figure 1 is a part-side view part-central vertical section showing one embodiment of my invention. Fig. 2 is a plan view of the check line showing its relation to adjacent parts. Fig. 3 is a vertical section showing the upper end of the check link adjusting member. Fig. 4 is a central vertical section at right angles to Fig. 3. Fig. 5 is a plan view of the check link. Fig. 6 is a section on the line 6—6 of Fig. 1. Fig. 7 is a fragmentary section showing a modification. Fig. 8 is a section on the line 8—8 of Fig. 7. Fig. 9 is a section on the line 9—9 of Fig. 8. Fig. 10 is an end view of the bracket that supports the check link adjusting rod. Fig. 11 is an enlarged plan view of the slot in the base of the scale, showing the manner in which access is had to the check link adjusting mechanism. Fig. 12 is a section on the line 12—12 of Fig. 8.

Similar reference characters refer to like parts throughout the several views.

In the embodiment of my invention shown in Figs. 1 to 6 inclusive, 1 indicates the base, 2, the hollow pedestal, and 3, the head, within which the drum 4 bearing cost figures is mounted to rotate about a horizontal axis in a well known manner. Rising from the base is a post 5 on which are supported bearings 6 for the knife edges 8 (but one of which is shown) that project from the main scale beam 9. One end of the beam passes through a slot 10 in the pedestal and is connected in any preferred manner to the piston rod 11 of a dash-pot 12, and to a main rod 13, the upper end of which is toothed to engage with the pinion 14 on the shaft 15 of the drum 4. Projecting from the opposite end of the beam are knife edges 16 (but one being shown) on which rest the bearing blocks 18 of a spider 19, the arms of which inclose and position the scale-pan 20. The spider has rigidly secured thereto, preferably by the bolts 21, an L-shaped check arm 22 that also passes through the slot 10 and has its upper portion inclosed in the hollow pedestal 2. The said upper portion may be of a skeleton nature (the longitudinal portions 24 and 25 being joined at intervals by cross-lugs 26) and is perforated to receive a check link adjusting and supporting rod 28, that may be threaded at its lower end to pass through a thumb-nut 29 located in a slot 30 formed in the check lever. Upon turning the nut, the rod is adjusted vertically; it is preferred to split the upper end of the member 24 (Fig. 6) and to join the bifurcations by a cross bolt 32, whereby the rod 28, after being adjusted, may be rigidly clamped in place.

The upper end of the rod 28 may be flattened and shouldered, and secured thereto, preferably by the screws 34, is a check-link retaining plate 35 slotted at 36 (Fig. 3) and provided with inwardly extending portions 38, thus making the width of the lower portion of the slot less than that of the upper. Mounted in a suitable manner, preferably on the inner wall of the pedestal, is a rod 39, one end 40 of which may be turned down and has secured thereto a retaining plate 41, the counterpart of plate 35. These plates constitute supports for the opposite ends of a check link 42 (Fig. 5); as indicated therein, the ends of the link are cut away at 43 and 44 to clear the rods 28 and 39, respectively, and have out-turned ears 45, the inner faces of which are inclined to form knife edges 46, all lying in a single plane and bearing on the outer surfaces of the portions 38 of the retaining plates, whereby free swinging movement of the check link is insured. The latter is inserted in position by merely passing its ends through the corresponding slots 36 and allowing it to fall into place. Stampings 47 (each of which may have an edge 48 and bent ears 49 at its ends) embrace the upper portion of the retaining plates and are secured thereto by one of the screws 34. The lower edges of the stampings closely approach the upper surface of the check link, thus preventing the link from rising in the slots 36.

Access to the interior of the hollow pedestal is obtained at the top by removing a closure 51 normally held in position over an opening in the pedestal wall by screws 52; and, at the bottom, by turning the latch 53 of a door 54, the latter being pivoted or otherwise attached to the pedestal and arranged to close an opening therein.

In use, the parts are assembled and the rod 28 is adjusted by the nut 29 until the check link 41 is exactly parallel to the line joining the knife edges on the main beam. It will be seen that in making this adjustment it is unnecessary to tilt the scale about its base, as in ordinary constructions, and that the adjusting elements are accessible from a point above the base. These features are particularly advantageous. After being adjusted, the parts are clamped together by the bolts 32.

Referring to the modification shown in Figs. 7 to 12, inclusive, the base 1, post 5 and main scale beam 9 are substantially the same as heretofore described; and the pan 20 is supported on the main beam by knife edges 60 as before. The spider 61, however, has a boss 62 in which the upper end of a check arm 63 is threaded and locked by a nut 64.

Secured to the lower surface of the base is a bracket comprising the upper base plate 66 and the lower base plate 68, with which are integrally formed the connecting posts 69 (Fig. 10); and the upper and lower bases are connected by the guide rod 70. Also joining the upper and lower bases is a screw 71, the lower end of which is reduced to turn freely in the lower base, while the upper end is slotted at 72 to receive a screwdriver and passes through a slotted nut 73, threaded into the upper base. The screw 71 is also threaded into and passes through a member 75 having at one side a slotted projection 76 that embraces the guide rod 70; and to the opposite side of the member is secured, by means of the screws 78, a retaining plate 79, which differs from the plate 35 merely in that it is considerably wider than the latter. The corresponding parts of the two plates have, therefore, been indicated by the same numerals. A similar retaining plate 80 is attached to the lower end of the check arm 63, and these plates are connected by a check link 81 that differs from the check link 42 only in width. The ends of the check lever are prevented from rising in the slots in the retaining plates by clips 82, that correspond to the stampings 47.

While the change in retaining plates and check link is one of proportion only, the greater width gives rise to an important advantage. It is found in practice that, when a twisting force is applied to the spider (for example, by the sealer), the resulting tendency to turn in a horizontal plane often displaces the bearings 18 slightly on the knife edges 16, and that they may not thereafter resume their original relation to one another, which results in inaccurate weighing and in a rejection of the scale. When, however, the check link is widened in the proportions shown, or to a greater degree, it opposes a substantial resistance to this displacement, and tends to cause the bearings to return to their initial position after being displaced. The link shown in Fig. 1 may obviously be made of similar proportions, if desired.

In order to allow access to the screw 71 and nut 73 for adjustment purposes, the upper wall of the base is slotted at 85. This slot may be narrowed and continued at 86 to allow the passage of a screw 88; and the opposite end of the upper base 66 of the bracket may be correspondingly slotted at 89 to receive a screw bolt 90. By this means it will be seen that the check link may also be adjusted in a horizontal direction. I do not, however, claim these specific features as I am not the sole inventor thereof. My sole invention nevertheless does include the use of means for adjusting one end of the check link vertically without tilting the scale about its base, and also includes both shape and proportions of the check link and the retainer plates.

Various changes may be made in the details without departing from the spirit of the invention, and I do not, therefore, wish to be limited otherwise than as indicated by the subjoined claims.

I claim:—

1. A scale comprising in combination a frame including a base, a main beam supported by and pivoted to swing vertically in respect to the frame, a check arm pivotally mounted on the main beam, a check link attached to the check arm and arranged to swing freely in respect thereto, one end of the check link being supported by and adapted for free swinging movement in respect to the frame, and means carried by the check arm for adjusting one end of the check link in a vertical direction to cause the check link to become parallel to the line joining the axis of the pivot for the main beam to the axis of the pivot for the check arm, said adjusting means being accessible from above the base without tilting or lifting the scale.

2. A scale comprising in combination a base and a hollow closed pedestal rising from the base, a main beam supported by and pivoted to swing vertically in respect to the base, a check arm pivotally mounted on the main beam, a load-receiving member secured to the check arm, said check arm extending into the hollow pedestal, a check link attached to the check arm within the pedestal and arranged to swing freely in respect to the lever, means for supporting one end of the check link, said link being arranged to swing freely on the supporting means, means carried by the check arm for adjusting one end of the check link in a vertical direction to cause the check link to become parallel to the line joining the axis of the pivot for the main beam to the axis of the pivot for the check arm, said pedestal having an opening formed in its wall adjacent the adjusting means for the check link, and a closure for the opening movable from closed to open position, whereby the adjusting means is rendered accessible without lifting or tilting the scale when the closure is in open position.

3. A scale comprising in combination a frame including a base, a main beam supported by and pivoted to swing vertically in respect to the frame, a check arm pivotally mounted on the main beam, said check arm having a substantially vertical portion, said portion including a vertically movable adjusting member, a check link attached to the adjusting member and arranged to swing freely in respect thereto, means for separately supporting one end of the check link, said link also being arranged to swing freely in respect to the supporting means, means for moving the adjusting member in respect to the arm of the check arm, whereby the check link may be accurately adjusted with reference to the line joining the axis of the pivot for the main beam to the axis of the pivot for the check arm, said means for moving the adjusting member being accessible from above the base.

4. A scale including in combination, a base and a hollow closed pedestal rising from the base, a main beam supported by and pivoted to swing vertically in respect to the frame, a check arm pivotally mounted on the main beam, said check arm having a substantially vertical portion extending into the hollow pedestal, said portion including a vertically movable adjusting member, a check link attached to the adjusting member and arranged to swing freely in respect thereto, means located within the pedestal for separately supporting one end of the check link, said link also being arranged to swing freely in respect to the supporting means, means for moving the adjusting member in respect to the arm of the check arm, whereby the check link may be accurately adjusted with reference to the line joining the axis of the pivot for the main beam to the axis of the pivot for the check arm, said pedestal having an opening in the wall thereof adjacent the means for moving the adjusting member, and a freely removable closure for the opening, whereby the parts are rendered accessible without lifting or tilting the scale.

5. A scale including in combination a base and a hollow closed pedestal rising from the base, a main beam supported by and pivoted to swing vertically in respect to the frame, a check arm pivotally mounted on the main beam, said check arm having a substantially vertical portion extending into the hollow pedestal, said portion including a split upper end, a vertically movable adjusting member slidable through said end, means for forcing the portions of the end together to clamp the adjusting member in adjusted position, said arm also having a slot across which the adjusting member passes, a nut in the slot for moving the adjusting member, a check link attached to the adjusting member and arranged to swing freely in respect thereto, means located within the pedestal for separately supporting one end of the check link, said link also being arranged to swing freely in respect to the supporting means, means for moving the adjusting member in respect to the check arm, whereby the check link may be accurately adjusted with reference to the line joining the axis of the pivot for the main beam to the axis of the pivot for the check arm, said means for moving the adjusting member being accessible from above the base.

6. Check mechanism for scales comprising a check arm, a retainer plate carried thereby, a check link supported at one end on the retainer plate, a second retainer plate on which the other end of the check link is supported, a support for the second retainer plate, each of said retainer plates being slotted horizontally and the lower portions of said slots being restricted at each side, said check link comprising a body portion having a pair of laterally extending knife edge ears at each end, the body of the check link extending through the restricted portion of each of the retainer plates and the ears being arranged to engage the opposite faces of the retainer plates.

7. Check mechanism for scales comprising a check arm, a retainer plate carried thereby, a check link supported at one end on the retainer plate, a second retainer plate on which the other end of the check link is supported, a support for the second retainer plate, each of said retainer plates being slotted horizontally and the lower portions of said slots being restricted at each side, said check link comprising a body portion having a pair of laterally extending knife edge ears at each end, the body of the check link extending through the restricted portion of each of the retainer plates and the ears being arranged to engage the opposite faces of the retainer plates, the distance between the members of each pair of ears being substantially equal to or greater than the distance between the separate pairs of ears.

8. Check mechanism for scales comprising a check arm, a retainer plate carried thereby, a check link supported at one end on the retainer plate, a second retainer plate on which the other end of the check link is supported, a support for the second retainer plate, each of said retainer plates being slotted horizontally and the lower portions of said slots being restricted at each side, said check link comprising a body portion having a pair of laterally extending knife edge ears at each end, the body of the check link extending through the restricted portion of each of the retainer plates and the ears being arranged to engage the opposite faces of the retainer plates, and means carried by the retainer plates for preventing the check link from rising in the slots.

9. A scale comprising in combination a main beam, a check arm carried by the main beam, knife edge bearings for the check lever, a load support carried by the check lever, a retainer plate secured to the check lever, a check link supported at one end on the retainer plate, a second retained plate on which the other end of the check link is supported, a support to which the second retainer plate is secured, each of said retainer plates being slotted horizontally and the lower portions of said slots being restricted at each side, said check link comprising a body portion having a pair of laterally extending knife edge ears at each end, the body of the check link extending through the restricted portion of each of the retainer plates and the ears being arranged to engage the opposite faces of the retainer plates, the distance between the members of each pair of ears being substantially equal to or greater than the distance between the separate pairs of ears, whereby the check arm is prevented from becoming displaced in respect to the knife edge bearings upon which it is supported.

In testimony whereof I sign this specification in the presence of two subscribing witnesses.

LOUIS JAENICHEN.

Witnesses:
L. M. SPENCER,
HUGO W. KREINBRING.